July 15, 1941.  D. G. TAYLOR  2,249,623
CONTROL VALVE
Filed April 30, 1938
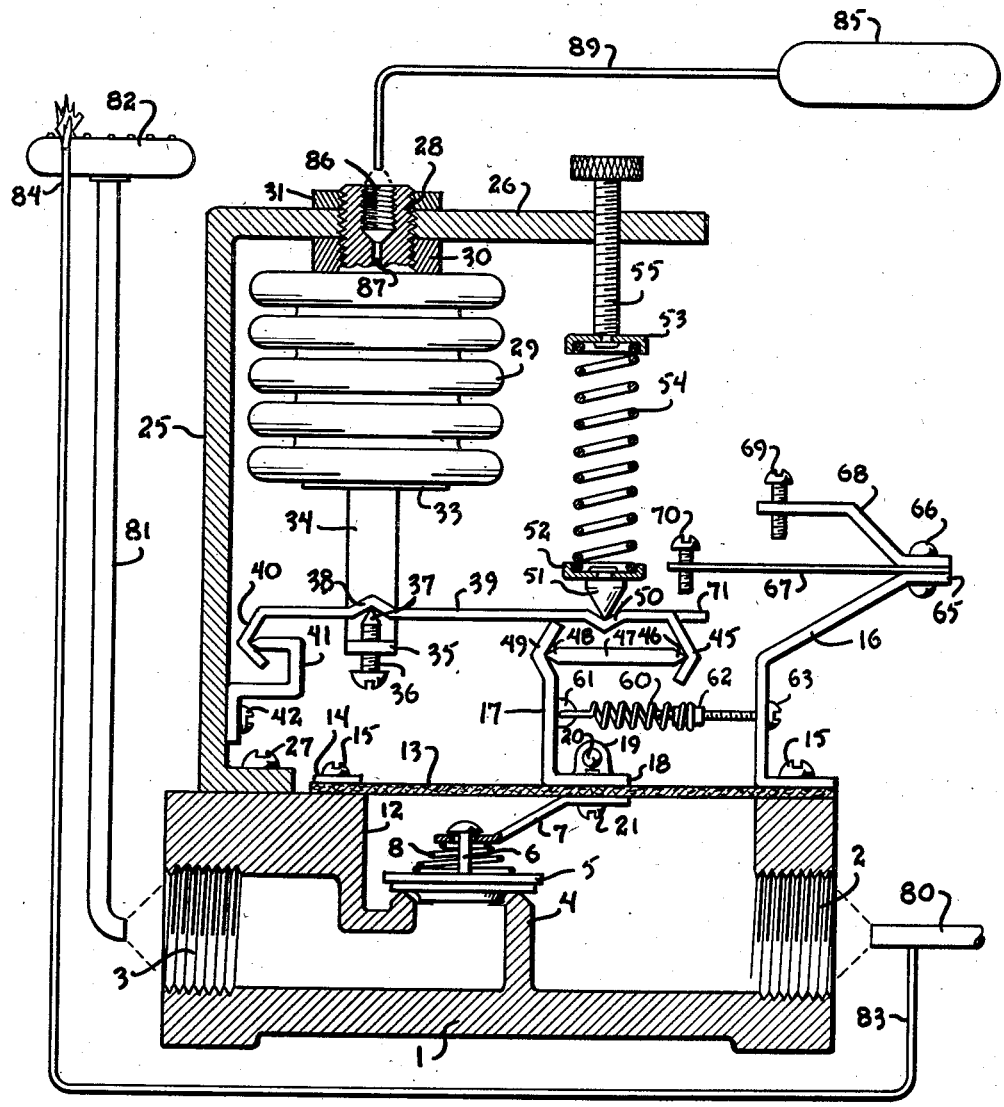
Inventor
Daniel G. Taylor
By
*George H Fisher*
Attorney Patented July 15, 1941

2,249,623

UNITED STATES PATENT OFFICE 2,249,623

CONTROL VALVE

Daniel G. Taylor, Minneapolis, Minn., assignor to Minneapolis-Honeywell Regulator Company, Minneapolis, Minn., a corporation of Delaware Application April 30, 1938, Serial No. 205,307

13 Claims. (Cl. 137—139)

My invention relates to improvements in pressure control valves and is particularly applicable to the control of the supply of fluid fuels to gas burners and the like. When fluid fuel is in gaseous form, in order for a control valve to operate safely, its initial opening and final closing movements must be with a snap action. My invention involves improvements in control valves of the type which snap to a predetermined open position and thereafter throttle the flow to a maximum open position.

I have devised my valve and the actuating mechanism therefor having in mind as my object the provision of a combined snap-modulating control device especially efficient and satisfactory for meeting the requirements necessary in the fluid fuel control field. It is recognized that modulating control of temperature and the like is more economical and desirable than "on" and "off" control, and in the case of gaseous fuels and the like permits full utilization to be made of the flexibility of such fuels and the advantages inherently attendant to the use thereof. However, the initial opening and final closing movements of a fuel gas valve must be with a snap movement to avoid "popbacks" with which those skilled in the art are familiar and this, taken with other necessary features which such a valve must have, render the requirements which it must meet to be commercially successful, unusually stringent.

Among the other requirements of a valve of the type in question are that it must have accurate throttling characteristics during its throttling cycle; its snapping and modulating characteristics must be stable and capable of accurate adjustment as to snapping points, throttling range, and operating differential so that the valve is adapted for use under varying conditions and to different applications.

An object of my invention is the provision of a valve employing actuating mechanism based on the application of certain principles of mechanics in a new and unique manner whereby I am able to economically and efficiently meet the above requirements and at the same time produce a number of additional advantageous and important results.

The nature of my valve mechanism is such that I eliminate what is known to those skilled in the art as "vanishing contact pressure." In other words, my valve is actuated with true snap action, the mechanism of my invention maintaining a positive seating force upon the valve which disappears instantaneously and only upon the valve being snapped open. In prior art structures known to me the seating force upon the valve gradually diminishes to zero just before the snap, creating the above referred to "vanishing contact pressure" and permitting seepage through valve thus tending to defeat the very purpose of snap movement. The accomplishment of the above result is an object of my invention and I attain this advantage without employing cumbersome and unwieldly double snap movements, latch mechanism, or the like.

Another object of my invention is the provision of a snap-modulating fluid control valve, the actuating mechanism of which is entirely free from the effects of variable fluid pressures impressed upon the valve.

A further object of my invention is the provision of an automatic temperature responsive control valve having actuating mechanism capable of setting up forces for positively maintaining the valve seated and for snapping the valve open but which forces have no components influencing the temperature responsive mechanism whereby accurate operating adjustments may be made without regard to the magnitude or variability of the said forces.

Another object of my invention is the provision of a snap-modulating valve which will snap open to a wider opening than that from which it snaps shut thus insuring the proper supply of gas for establishment of a flame at the initiation of a heating cycle and also providing for throttling action over a substantial range of valve movement.

Another object is the provision of a snap-modulating valve having snapping mechanism and a constructional arrangement for additionally resisting further opening of the valve after it has snapped to a predetermined position.

Other objects will appear from the detailed description hereinafter, the invention residing in the improved construction, combination, and arrangement of parts and numerous advantages of my invention will appear and become clear as my specification proceeds.

The single figure of the drawing is a cross section of one embodiment of my improved valve showing diagrammatically how it may be incorporated in a gas fired heating system.

With respect to the drawing I desire to point out that I have varied the proportioning of the elements so as to make a clear and distinct showing of all parts and their manner of operation. In practice my device may have a very compact and neat design lending itself desirable to marketing as an article of commerce.

Referring to the drawing, numeral 1 represents the body of my improved control valve, the valve having an inlet as indicated at 2 and an outlet at 3. The valve body may be formed as a casting, being internally formed to provide a seat 4. The valve member 5 may be of conventional construction and has a stem 6 engaged by a portion of an operating lever 7, as shown. Interposed between the valve member 5 and the lever 7 is a coiled press-back spring 8 providing for a resilient floating connection between the valve and its actuating means. The upper part of the body of the valve has an opening at 12 which may be circular and which is covered and sealed by means of a flexible diaphragm 13. The peripheral portions of the diaphragm 13 are secured to the upper flat surface of the valve body by means of a metal ring 14 which is screwed to the valve body by means of screws 15, as shown. At one side of the ring 14 there is an integral upstanding supporting portion 16 which will be more particularly referred to hereinafter as the description proceeds.

It will be seen that a portion of the lever 7 previously described engages a central portion of the underside of the diaphragm 13. Above the diaphragm and outside of the valve body itself is a lever member 17 extending substantially vertically and having a horizontal portion 18 which engages the central portion of the diaphragm 13 and which has a lug 19 providing for pivoting of element 17 at point 20. The horizontal portion 18 of lever 17, diaphragm 13, and the lever 7 are secured together by means of a screw 21 as shown. It will now be obvious that the levers 7 and 17 being secured together and pivoted at 20 form a lever actuating device for the valve member 5. Pivoting or rocking about the point 20 is permitted by reason of the flexibility of diaphragm 13. Because of the fixed pivot 20 varying gas pressures acting on diaphragm 13 obviously have no influence on the actuation of levers 7 and 17.

The structure for producing automatic actuation of my improved valve in the particular manner of my invention will now be described. Numeral 25 represents an upright support having a horizontal portion 26 which is screwed to the body of the valve 1 by means of a screw 27. Supported from the horizontal portion 16 of upright 25 by means of a screw threaded nipple 28 is an expansible bellows element 29. The nipple 28 is in screw threaded relation with portion 26 and the bellows itself is spaced from portion 26 by a spacing member 30. A lock nut 31 is screwed on to the nipple 28 on the upper side of portion 26 so as to rigidly secure the nipple, bellows and spacing member in their respective relation. The bellows 29 is filled with a temperature responsive medium and operates in a manner well known in the art to expand and contract in accordance with temperature changes. I prefer to use a medium within the bellows 29 such as ethyl ether, which will operate at pressures less than atmospheric, for a purpose which will be hereinafter described. The bellows 29 has a diaphragm 33 sealing its lower end which has an actuating member 34 attached thereto. The actuating member 34 has a horizontal portion 35 through which a screw 36 extends upwardly, the screw having a conical point 37. The conical point 37 is received in a similarly shaped recess 38 in a lever 39. It will be seen that the left end of the lever 39 has an angular portion 40 which engages with an angular bracket 41 secured to the upright 25 by means of a screw 42. The right end of the lever 39 has an angular portion 45 shaped so as to receive a knife edge 46 at one end of a link 47. The other end of the link 47 also has a knife edge 48 which engages an angular portion 49 of lever 17 which is formed to receive the knife edge. The lever 39 also has a conically shaped recess at 50 arranged to receive a member 51 having a conical point similar to the conical point 37 of screw 36. The element 51 is secured to a spring retaining element 52 and engaged between this spring retaining element and another spring retaining element 53 is a coiled compression spring 54. The spring retaining element 53 is riveted to the end of a thumb screw 55 which is in screw threaded relation with the portion 26 of upright 25 as shown. The force exerted by coil spring 54 may obviously be adjusted by means of thumb screw 55.

Referring again to the lever 17 it will be seen that a coil spring 60 is attached to the lever at 61. The other end of the coil spring 60 is secured to a block 62 through which extends a screw 63, the screw 63 also extending through an aperture in the supporting member 16, previously described. The coil spring 60 is normally under tension biasing the levers 17 and 7 in a clockwise direction about pivot point 20. From the structure so far described it will be understood that the lever 39 is supported by reason of its engagement with the angle member 41, the knife edge 46 and by the forces exerted by a bellows 29 and coil spring 54. The link 47 is in floating engagement between the receiving points of the knife edges at its ends. When the lever 39 and link 47 are in the positions shown in the drawing, they are substantially horizontal and the lever 39 engages the end of the angular portion 49 of lever 17 as shown, this end portion forming a stop preventing further downward movement of lever 39.

It is important that with the parts in the position shown in the drawing, the longitudinal axis of link 47 passes through the point of engagement of lever 39 with bracket 41, the said point of engagement being one about which lever 39 may pivot. It will be obvious from the drawing that spring 60 exerts a force against portion 45 of lever 39 which force is along the axis of link 47. As long as this axis passes through the pivot point of lever 39, it is obvious that the force of spring 60 has no component capable of producing a turning moment upon lever 39 about its pivot point. The significance of this structural feature of my invention will become more apparent as my specification proceeds.

Referring now to the supporting member 16, it will be seen that this member is conformed so as to have a horizontal portion at 65. Secured to this horizontal portion 65 by means of rivet 66 are a leaf spring 67 and a member 68 having an adjustable stop screw 69, as shown. The leaf spring 67 also has an adjustable screw 70 which may be engaged by an end portion 71 of the lever 39 when the lever 39 is moved upwardly a predetermined amount. As will become more clear from the description of operation of my device below, the leaf spring 67 may be moved upwardly by the lever 39 until it meets the stop screw 69. The stop screw 69 provides a limit of upward travel of leaf spring 67 and lever 39.

My improved control valve is particularly adapted for controlling fluid fuel such as gas and may be employed in a gas fired heating system or may control the flow of gas to unit heaters and the like. As an example of one application of my invention, I have shown it in connection with a gas fired heating system for a building.

Referring to the drawing, numeral 80 represents a gas supply conduit which may be connected to the inlet 2 of my improved valve. The outlet 3 may be connected by conduit 81 to a conventional burner 82 for generating heat in a furnace or the like. Numeral 83 represents a small supply conduit for a constantly burning pilot burner 84. When my improved valve is used with unit gas heaters or the like, the bellows element 29 may be directly responsive to the ambient temperatures and may control the valve accordingly. However, in a system employed for heating the rooms of a building a remote bulb such as the bulb 85 may be located in the spaces being heated and serves to control the valve. It will be seen that the nipple 28 has an internal screw-threaded opening 86 which communicates with the interior of the bellows by a port 87 and which may be sealed by means of a plug when the remote bulb 85 is not being used. When the bulb 85 is to be used, it may be connected to the nipple 28 by means of a capillary tube 89 and suitable connecting fittings of conventional type.

Operation

By reference to the drawing, the operation of my improved control valve may be understood from the following description. Assuming that the burner 82 forms part of a heating system for a building and the valve is being controlled by the remote bulb 85 located in one of the spaces being heated, the valve as shown is in closed position indicating the thermostat is satisfied. With the parts of the valve mechanism in the position shown in the drawing, the press-back spring 8 is under compression and thereby exerting a positive seating force upon the valve member 5. The reaction of this force obviously tends to rotate the levers 7 and 17 in a clockwise direction, and this force is thereby transmitted by lever 17 to the link 47 in a direction along the longitudinal axis of link 47. As the axis of link 47 in its present position passes through the point about which lever 39 may pivot, it is obvious that the reaction of the force exerted by spring 8 has no component tending to produce a rotating moment about the pivot point of lever 39. Similarly, forces produced by varying gas pressures acting on valve member 5 exert no effect tending to move lever 39 out of its position. The force exerted by tension spring 60 is transmitted to the link 47 in the same manner and for the same reasons as just pointed out has no component tending to produce a rotating moment about the pivot point of lever 39. From the above, it follows that in order to move the parts out of their present position an upward force must be applied to the lever 39 by means of the screw 36 and this force must only exceed the downward force exerted by coil spring 54 before the lever 39 can be moved upwardly. Thus the force which must act upon the temperature responsive bellows 29 for opening the valve is dependent solely upon the adjustments of the coil spring 54. I will refer to this feature later when I describe the manner of making adjustments in the valve.

Now should the temperature affecting the bulb 85 fall to a predetermined value at which the valve is to open, the pressure within bellows 29 will have decreased to such an extent that atmospheric pressure acting against diaphragm 33 will produce an upward force on lever 39 which exceeds the downward force exerted by spring 54. As soon as this condition obtains, lever 39 will be moved slightly in a counter-clockwise direction thereby moving the right end of link 47 in a counter-clockwise direction causing it to snap out of its dead-center position. The snap movement will take place by reason of the fact that as soon as the link 47 is moved out of its dead-center position, the force exerted by spring 60 has a component now acting to move link 47 and to rotate the lever 39 in a counter-clockwise direction about its pivot point. Obviously, the more link 47 is moved out of its dead-center position, the greater is the component of the force exerted by spring 60 which is substantially at right angles to the lever 39 on which it acts in opposition to the coil spring 54. This component of force increases as lever 39 moves upwardly, at a greater rate than the resistance of spring 54 increases, thus insuring the snap movement. It will be seen that the pressure exerted by spring 8 upon the valve member 5 will be effective at all times until the snap mechanism is snapped from its dead-center position, and at this time the pressure exerted by spring 8 will be instantaneously removed so that the effect which I have previously described as "vanishing contact pressure" will not exist. The mechanism will snap to a predetermined open position of the valve 5 which will be determined by the leaf spring 67 and screw 70. It will be seen that as the mechanism snaps, the right end 71 of lever 39 will meet the stop screw 70 and will bend the leaf spring 67 upwardly an appreciable amount to a point at which its resistance terminates the opening snap movement.

As soon as the valve is snapped open, gas will, of course, be supplied to the burner 82 through the pipe 81 and heat will be supplied to the spaces being heated. The valve will now be operated in a throttling manner in response to the temperature bulb 85 and will control the flow of gas accordingly. It will be seen that now upon any further decrease in temperature affecting bulb 85, the pressure within bellows 29 will be decreased and therefore the increased effect of the atmospheric pressure on diaphragm 33 will move the lever 39 upwardly against the force of both springs 54 and 67 and the valve 5 will be positioned accordingly. By means of leaf spring 67 and screw 70, I adjust the amount of initial snap of the valve so that sufficient gas will be supplied for establishment of flame at the burner and thereafter the leaf spring 67 cooperates with the coil spring 54 to provide the proper throttling effect in response to the thermostatic bulb 85. A predetermined temperature will now be attained in the rooms being heated and the valve will be operated in response to the bulb 85 to maintain this temperature. If for any reason, the temperature of the room should fall to a relatively low value, the valve will be positioned to a relatively wide open position at which the leaf spring 67 will meet the stop screw 69. The stop screw 69 therefore acts as a limit to the upward travel of lever 39 and determines the maximum open position of the valve.

Should the temperature of the space being heated now rise to a predetermined value at which the valve is set to close, the pressure within bellows 29 will have increased sufficiently so that its resultant effect with the force of atmospheric pressure on diaphragm 33 will have permitted spring 54 to move lever 39 and link 47 in a clockwise direction to a position at which the end 71 is about to become disengaged from the screw 70. In other words, at this time the leaf spring 67 is under substantially no tension. It will be seen, of course, that this clockwise movement of lever 39 and link 47 moves levers 17 and 7 in a counter-clockwise direction tending to move valve member 5 towards its seat. This movement of lever 39 and link 47 also tends to stretch the coil spring 60 as is obvious from the drawing. As the link 47 moves towards its dead-center position, the component of the force exerted by spring 60 tending to resist counter-clockwise movement of lever 17 and downward movement of the right end of link 47 becomes less. At substantially the position of lever 39 at which leaf spring 67 is no longer under tension, this component of force exerted by spring 60 will have diminished to such an extent that the link 47 will be snapped into its dead-center position and the parts will again assume the position shown in the drawing. From the above description of operation, it will be seen that my valve snaps open to a wider open position than that from which it snaps shut. This is a distinct advantage inasmuch as it insures a sufficient supply of gas upon opening of the valve for establishing of flame in the burner 82. The snap movement of the valve to closed position after the throttling cycle when the thermostat has become satisfied quickly shuts off the supply of gas to the burner and prevents pop-backs which is a hazard attendant to the use of slow acting valves.

As I have already shown, the upward force which must be exerted by the screw 36 in order to open my valve must only exceed the downward force of spring 54. As I have explained, the forces exerted by springs 8 and 60 have no bearing upon the force necessary to open my valve. I may, therefore, precisely adjust the temperature at which the valve may open by adjusting the thumb screw 55. It is obvious, therefore, that I have a unique arrangement whereby I need not reckon with the magnitude or variability of the forces exerted by the press-back spring or the toggle spring 60. Obviously, it follows that my adjustment of the opening temperature of the valve may be more accurately made and maladjustment is much less likely to come about. By adjusting spring 54 to adjust the opening temperature of the valve, closing temperature is correspondingly varied. Thus, as thumb screw 55 is turned down so as to increase the force exerted by spring 54, it will be seen that the temperature affecting bulb 85 and consequently the pressure within the bellows 29 will have to be lower before atmospheric pressure acting against diaphragm 33 can cause link 47 to snap upwardly against the force of spring 54. If the opening temperature is reduced in this manner, the closing temperature of the valve will be correspondingly reduced inasmuch as the increased force exerted by spring 54 will be available in a downward direction to assist the pressure within bellows 29 in causing closure of the valve.

The operating differential of the valve may be conveniently adjusted by varying the tension of spring 60 by means of adjusting screw 63. If the screw 63 is adjusted so as to increase the tension of the spring 60, it is readily seen that increased force will be necessary to move the right end of link 47 downwardly inasmuch as this movement of link 47 causes counter-clockwise movement of lever 17 tending to stretch spring 60. Thus, this adjustment of spring 60 will increase the closing temperature of the valve, but, as has already been described, has no effect upon the opening temperature.

As I have previously pointed out, I may adjust the amount of the initial snap of the valve by adjustment of screw 70 which determines the amount of travel in opening direction of the valve when it snaps. By reason of the leaf spring arrangement and the particular arrangement of the toggle link 47, I am able to adjust my valve so as to have a clear and well defined snap at either narrow or wide operating differentials and with various adjustments of the valve. At the moment the link 47 snaps from its dead-center position, the spring 60 will exert a force in opening direction of the valve which overcomes the force of spring 54 by margin. The result of this is that normally the leaf spring 67 will be placed under some tension in stopping the snap movement. Upon closing, the parts snap to closed position from a point at which the leaf spring is under zero tension, the advantage of which I have already pointed out.

From the foregoing, it should be apparent to those skilled in the art that I have provided a novel valve mechanism having both snap acting and modulating characteristics whereby it is adapted for control of fluid fuel, such as gas or the like. By my particular construction and arrangement, I have provided for positive and accurate adjustments for both the snapping and modulating features of the valve whereby my valve may be successfully employed under different operating conditions and may be adapted to various applications. It should be appreciated that in the past it has been found exceedingly troublesome to adjust valves of this type so that a well defined and proper snap would be obtained under different conditions and to satisfactorily adjust the operating temperatures and differential of the valve. My valve is free from these annoyances common to the prior art and as well is entirely immune to any effect from varying fluid pressures which may be impressed upon the valve.

By using a medium, such as ethyl ether having a pressure less than atmospheric in the temperature responsive part of my apparatus, I provide a safety feature in that should the bellows 29 become ruptured entailing loss of the medium therein the increased pressure exerted by the bellows when atmospheric pressure enters therein will cause the valve to be snapped shut so as to shut off the supply of fuel to the burner.

My invention may take various forms other than the embodiment disclosed and many changes will occur to those skilled in the art which have not been herein disclosed. I, therefore, intend that the disclosed embodiment of my invention be interpreted as illustrative only and that the scope of the invention be limited only as determined by the appended claims.

I claim as my invention:

1. In a valve of the character described, in combination, valve actuating means comprising snap mechanism which is substantially in dead center position when the valve is closed, a condition responsive element for moving said snap mechanism whereby the valve snaps open, and resilient means for resisting further opening movement of the valve actuating means whereby modulating action may take place in response to the condition responsive element.

2. In a control valve assembly, in combination, a valve, valve actuating means comprising a pivoted lever means connected to said valve, a lever arranged to be actuated by a condition responsive element, a link member engaged with said lever means and said lever in a manner so as to have a dead center position, resilient means cooperating with said valve actuating means so as to impart a quick movement thereto when said link is out of dead center position, means for resisting said movement, and other means for additionally resisting said movement when its magnitude has reached a predetermined value.

3. In a control valve assembly, in combination, a valve, valve actuating means comprising spring and toggle snap mechanism, a spring associated with said mechanism for urging said valve towards its seat, condition responsive means for actuating said snap mechanism so as to snap said valve in opening direction, and resilient means engaged by said valve actuating means when said valve has opened a predetermined amount, and said condition responsive means being operable to throttle said valve in conjunction with said resilient means.

4. In a control valve assembly, in combination, a valve member, and means comprising snap acting mechanism for actuating said valve member, said mechanism being substantially in dead-center position when said valve member is seated, said means causing a positive seating force to be applied to said valve member whenever said mechanism is substantially in said dead-center position.

5. In a control valve assembly in combination, a valve member, and means comprising snap acting mechanism for actuating said valve member, said mechanism being substantially in dead-center position when said valve member is seated, said means causing a positive seating force to be applied to said valve member whenever said mechanism is substantially in said dead-center position, said means being so constructed and arranged that the reaction of said seating force has no component tending to move said snap acting mechanism out of dead-center position.

6. In a control valve assembly in combination, a valve including a valve member, means for actuating said valve member comprising snap acting mechanism, said mechanism assuming substantially a dead-center position when said valve is closed, said means being effective to apply a continuous seating force to said valve member when the valve is closed, said means being so constructed and arranged that the reaction of said force has no component tending to move said snap acting mechanism out of dead-center position, and adjustable resilient means for determining the force necessary to be applied to said snap acting mechanism for snapping the valve open, said resilient means being the sole agency in determining the magnitude of said last mentioned force.

7. In a control valve assembly, in combination, a valve including a valve member, means for actuating the valve member comprising spring and toggle snap mechanism, a press back spring for said valve member, said snap mechanism assuming substantially a dead-center position when the valve is closed, condition responsive means and resilient adjusting means cooperating with said snap mechanism, said condition responsive means being operable to cause said actuating means to snap the valve member off its seat at a value of the condition determined by said resilient adjusting means, said spring and toggle mechanism and said press back spring exerting no forces affecting said resilient means when the valve is closed.

8. In a control valve assembly, in combination, a valve including a valve member, snap acting actuating mechanism for the valve member comprising a movable element, a pivoted lever connected to said valve member, a link cooperating with said movable element and said lever and a spring urging said lever in one direction, said element, lever, link, and spring being so related that said element may move said link out of a dead-center position whereupon said spring abruptly rotates said lever so as to actuate the valve member, said lever comprising two parts separated by a flexible diaphragm and joined adjacent the pivot point of the lever, said diaphragm sealing the interior of the valve from the actuating mechanism and permitting rocking movement of the lever for actuating the valve member.

9. In a valve actuating mechanism, in combination, means forming a toggle joint, said means including a pivotally movable member and a thrust member for exerting an end thrust when said joint is flexed, and means comprising a valve associated with the end of said thrust member and actuatable thereby, said last means including a resilient element exerting a reactionary end thrust on said thrust member, said first means having a position wherein the longitudinal axis of said thrust member extends through the pivot point of said pivotally movable member whereby said reactionary end thrust does not tend to flex the toggle joint.

10. In a valve actuating mechanism, in combination, means forming a toggle joint, said means including a pivotally movable member and a thrust member for exerting an end thrust when said joint is flexed, means comprising a valve associated with the end of said thrust member and actuatable thereby, said last means including a resilient element exerting a reactionary end thrust on said thrust member, said first means having a position wherein the longitudinal axis of said thrust member extends through the pivot point of said pivotally movable member whereby said reactionary end thrust does not tend to flex the toggle joint, and means so positioned as to be effective to resist further movement of said valve when said first means has moved out of said position a predetermined amount.

11. In a flow control device of the character described, in combination, a valve, valve actuating means comprising snap action mechanism, condition responsive means for causing said valve actuating means to snap said valve from closed to a minimum open position, and means comprising a resilient stop for determining said minimum open position and resisting movement of said valve beyond said position, said condition responsive means being operable to actuate said valve in a graduating manner between said minimum open and full open positions, said snap action mechanism being capable of snapping said valve to full open position if unopposed by said resilient stop.

12. In a device of the character described comprising in combination, a control member, operating means for moving said member between first and second positions, said operating means having a predetermined spring rate, means for over-compensating said spring rate as said control member is moved from a first position to an intermediate position, and means cooperating with said operating means at said intermediate position to increase the effective spring rate of said operating means to a degree such that said compensating means cannot compensate said increased spring rate as said member is moved from said intermediate position to said second position.

13. In a device of the character described comprising in combination, a valve, means for operating said valve including a resilient actuator responsive to the variations of a variable condition, connections between said actuator and valve by means of which said actuator moves said valve between open and closed positions, said operating means having a predetermined spring rate, a resilient spring positioned to be picked up as said valve is moved from closed to an intermediate position, said spring adding to the effective spring rate of said operating means, and means for overcompensating the spring rate of said operating means as said valve is moved from closed to said intermediate position, said last mentioned means being incapable of overcompensating the increased spring rate after said resilient spring has been picked up.

DANIEL G. TAYLOR.